United States Patent
Suto

(10) Patent No.: US 8,797,565 B2
(45) Date of Patent: Aug. 5, 2014

(54) IMAGE PROCESSING APPARATUS

(75) Inventor: Hideo Suto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 258 days.

(21) Appl. No.: 12/954,748

(22) Filed: Nov. 26, 2010

(65) Prior Publication Data

US 2011/0134462 A1    Jun. 9, 2011

(30) Foreign Application Priority Data

Dec. 3, 2009   (JP) .................................. 2009-275106

(51) Int. Cl.
- *G06F 11/30* (2006.01)
- *G06F 12/14* (2006.01)
- *G06K 15/00* (2006.01)

(52) U.S. Cl.
USPC ........................... 358/1.14; 713/152; 713/189

(58) Field of Classification Search
None
See application file for complete search history.

(56) References Cited

U.S. PATENT DOCUMENTS

| | | | |
|---|---|---|---|
| 2004/0064710 A1* | 4/2004 | Vainstein | 713/189 |
| 2006/0050302 A1 | 3/2006 | Sawaguchi | |
| 2006/0272033 A1* | 11/2006 | Paris et al. | 726/32 |
| 2007/0214494 A1* | 9/2007 | Uruta et al. | 726/2 |
| 2008/0115223 A1* | 5/2008 | Morris et al. | 726/27 |
| 2009/0205017 A1* | 8/2009 | Yabe | 726/1 |

FOREIGN PATENT DOCUMENTS

| | | |
|---|---|---|
| JP | H07-093352 A | 4/1995 |
| JP | 2003-122635 A | 4/2003 |
| JP | 2006-072892 A | 3/2006 |
| JP | 2007-034447 A | 2/2007 |

* cited by examiner

*Primary Examiner* — Marivelisse Santiago Cordero
*Assistant Examiner* — Moustapha Diaby
(74) *Attorney, Agent, or Firm* — Marvin A. Motsenbocker; Mots Law, PLLC

(57) ABSTRACT

An image processing apparatus includes: an acquisition unit configured to acquire data targeted for image processing; a memory unit configured to store the acquired data; an output unit configured to output the data; and an access-right controller configured to provide the data with pre-defined access right when the data are stored by the memory unit, and configured to change the access right when the data are output by the output unit.

10 Claims, 12 Drawing Sheets

FIG. 3

EXAMPLE OF JOB-SUBMISSION INFORMATION
INPUTTED ON OPERATION PANEL IN FIG. 1

JOB-SUBMISSION INFORMATION          40

| ITEMS | VALUES | |
|---|---|---|
| USER'S NAME | Yamada | 41 |
| USER'S DEPARTMENT | DEVELOPMENT DEPARTMENT | 42 |
| SERVICE YEARS | 11 | 43 |
| POSITION | ASSISTANT MANAGER | 44 |
| KID OF SUBMITTED JOB | Email TRANSMISSION | 45 |
| SET VALUE (DESTINATION ADDRESS) | Abe@oki.com | 46 |
| SET VALUE (FILE TYPE) | PDF | 47 |
| TIME AT JOB SUBMISSION | 15:03 | 48 |
| PASSWORD | ✳✳✳✳ | 49 |

EXAMPLE OF ACCESS-RIGHT SETTING TABLE 50 MANAGED BY LOG MANAGER IN FIG. 1

FIG. 4A
BEFORE CHANGE

| USER 51 | ACCESS TARGET 52 | | READING 53 | CHANGING 54 | EXECUTION 55 |
|---|---|---|---|---|---|
| USER A | PRINT | | — | — | ○ |
| | COPY | | — | — | ○ |
| | Email TRANSMISSION | | — | — | ○ |
| | FAX TRANSMISSION | | — | — | × |
| | ¥DATA STORING¥file001.dat | | × | × | — |
| USER B | PRINT | | — | — | ○ |
| | COPY | | — | — | ○ |
| | Email TRANSMISSION | | — | — | ○ |
| | FAX TRANSMISSION | | — | — | × |
| | ¥DATA STORING¥file001.dat | | × | × | — |
| USER C | PRINT | | — | — | ○ |
| | COPY | | — | — | ○ |
| | Email TRANSMISSION | | — | — | ○ |
| | FAX TRANSMISSION | | — | — | ○ |
| | ¥DATA STORING¥file001.dat | | ○ | × | — |
| ADMINISTRATOR | PRINT | | — | — | ○ |
| | COPY | | — | — | ○ |
| | Email TRANSMISSION | | — | — | ○ |
| | FAX TRANSMISSION | | — | — | ○ |
| | ¥DATA STORING¥file001.dat | | × | × | — |

FIG. 4B
AFTER CHANGE

| USER 51 | ACCESS TARGET 52 | | READING 53 | CHANGING 54 | EXECUTION 55 |
|---|---|---|---|---|---|
| USER A | PRINT | | — | — | ○ |
| | COPY | | — | — | ○ |
| | Email TRANSMISSION | | — | — | ○ |
| | FAX TRANSMISSION | | — | — | × |
| | ¥DATA STORING¥file001.dat | | ○ | × | — |
| USER B | PRINT | | — | — | ○ |
| | COPY | | — | — | ○ |
| | Email TRANSMISSION | | — | — | ○ |
| | FAX TRANSMISSION | | — | — | × |
| | ¥DATA STORING¥file001.dat | | ○ | × | — |
| USER C | PRINT | | — | — | ○ |
| | COPY | | — | — | ○ |
| | Email TRANSMISSION | | — | — | ○ |
| | FAX TRANSMISSION | | — | — | ○ |
| | ¥DATA STORING¥file001.dat | | ○ | × | — |
| ADMINISTRATOR | PRINT | | — | — | ○ |
| | COPY | | — | — | ○ |
| | Email TRANSMISSION | | — | — | ○ |
| | FAX TRANSMISSION | | — | — | ○ |
| | ¥DATA STORING¥file001.dat | | ○ | × | — |

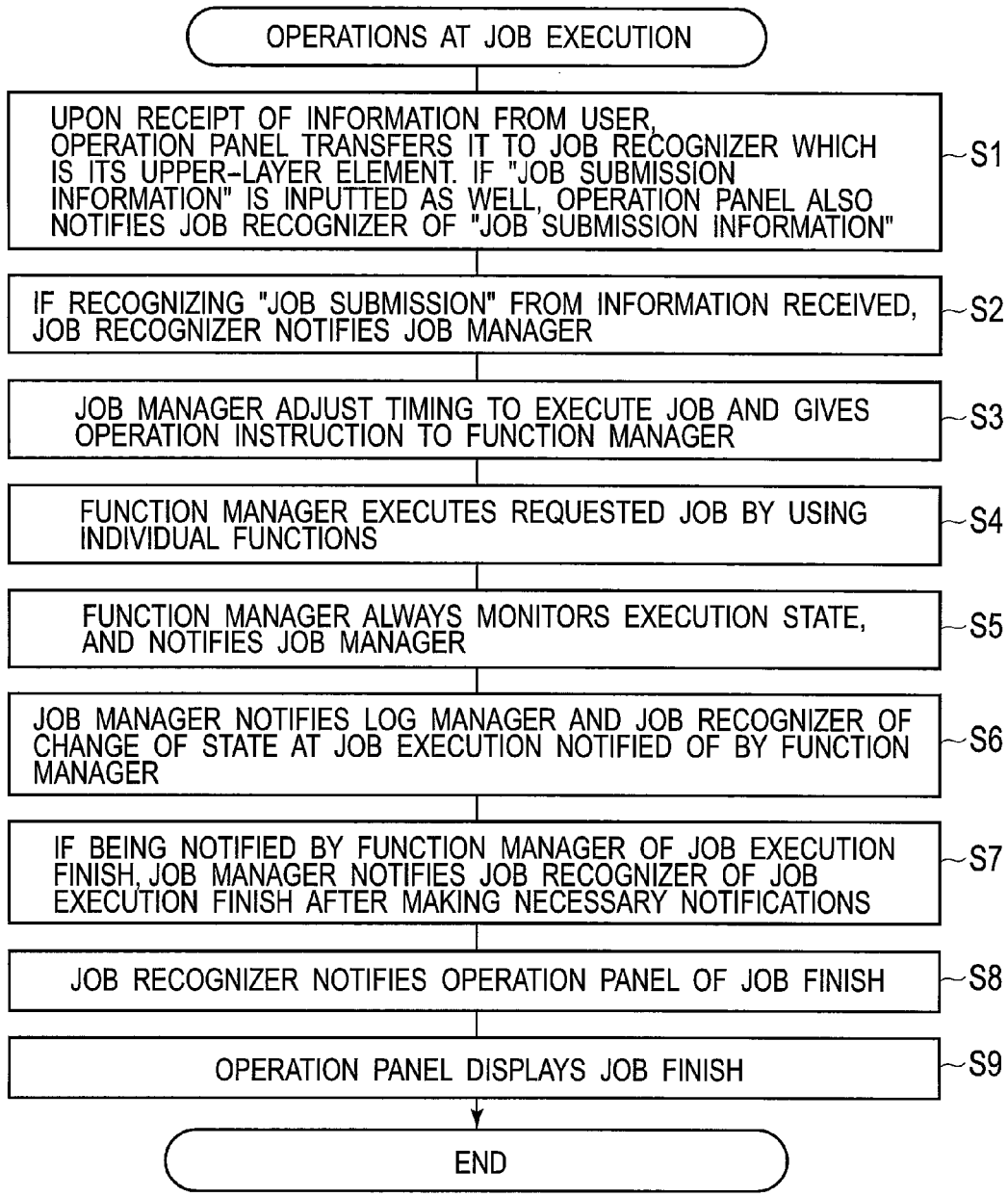

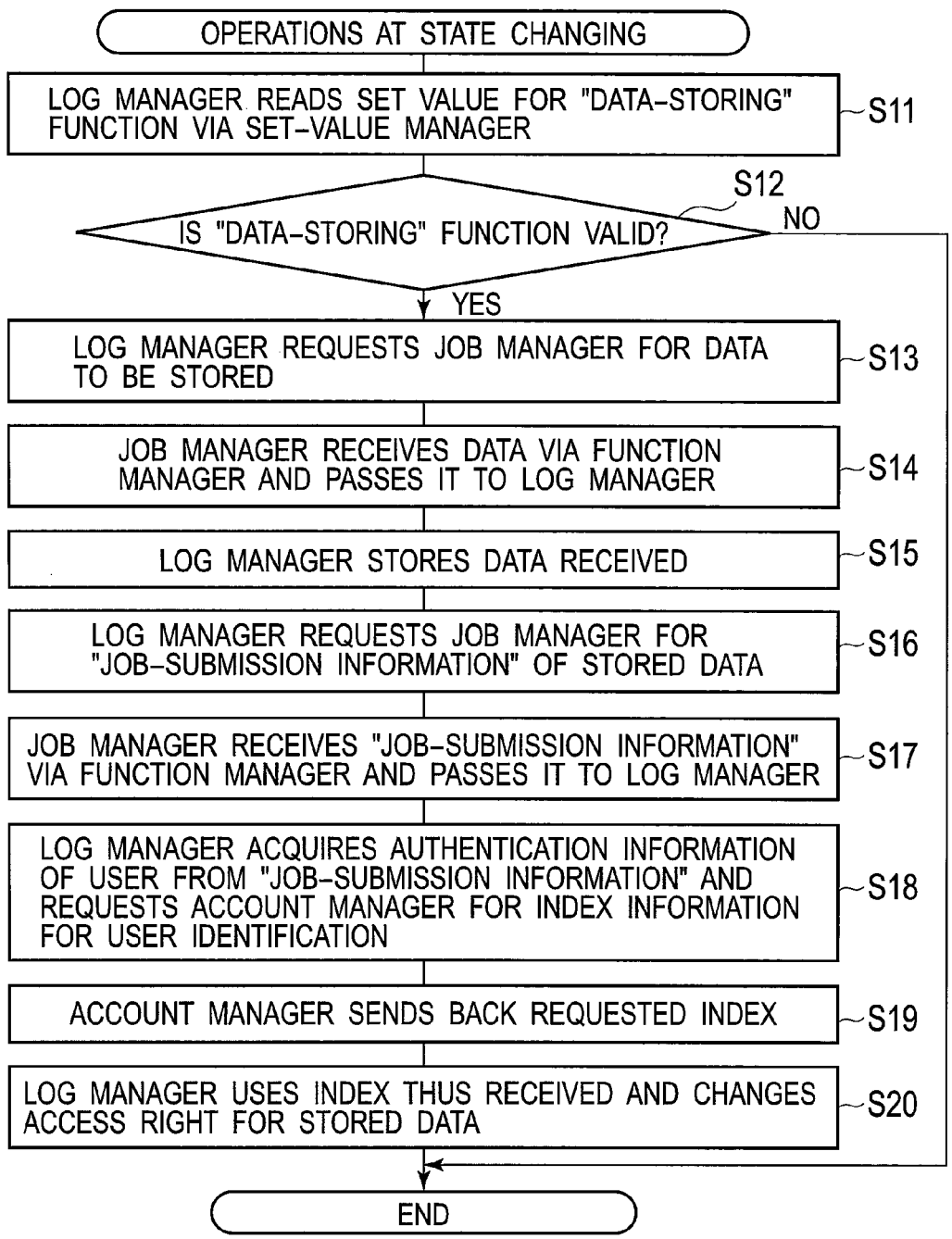

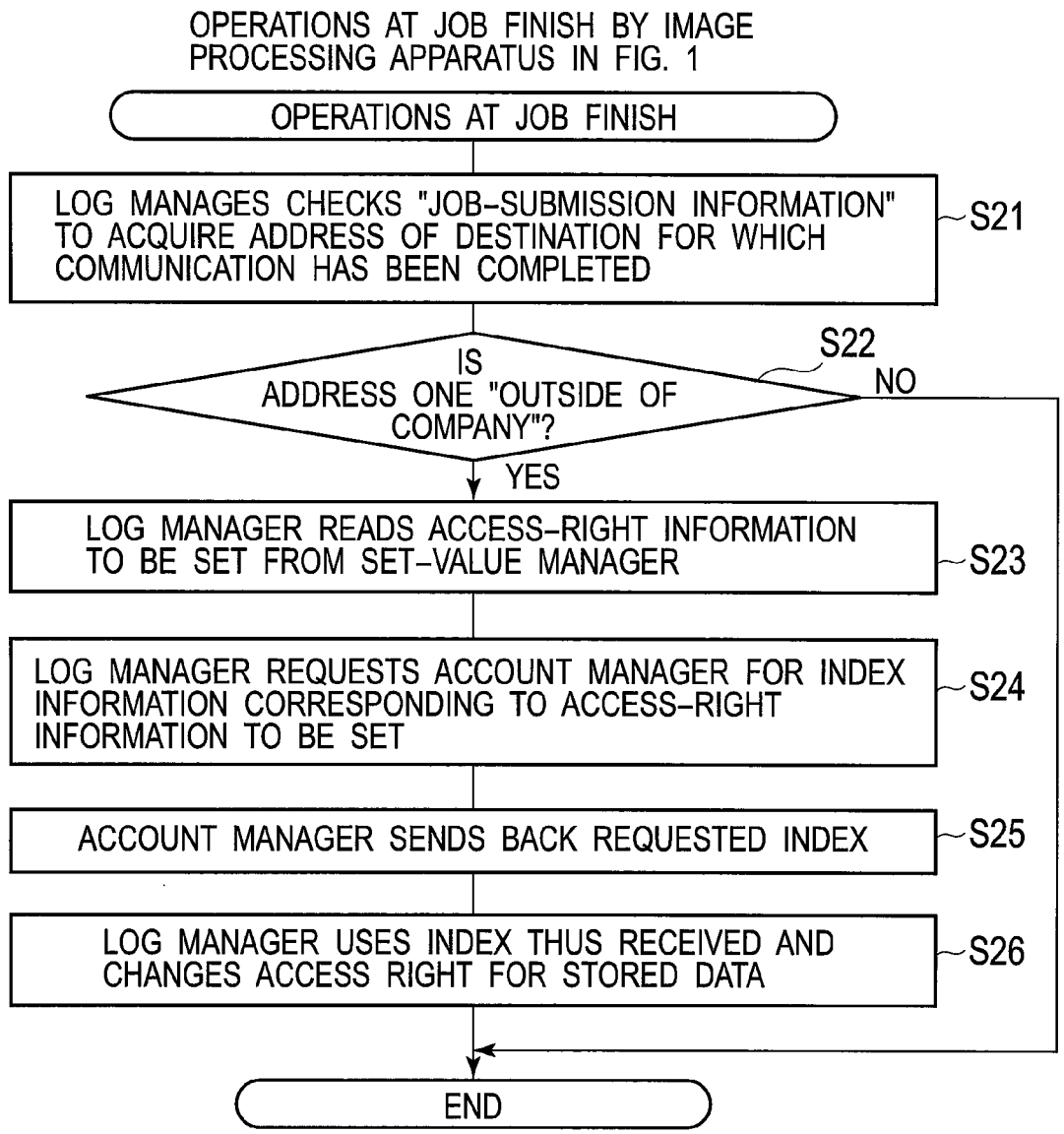

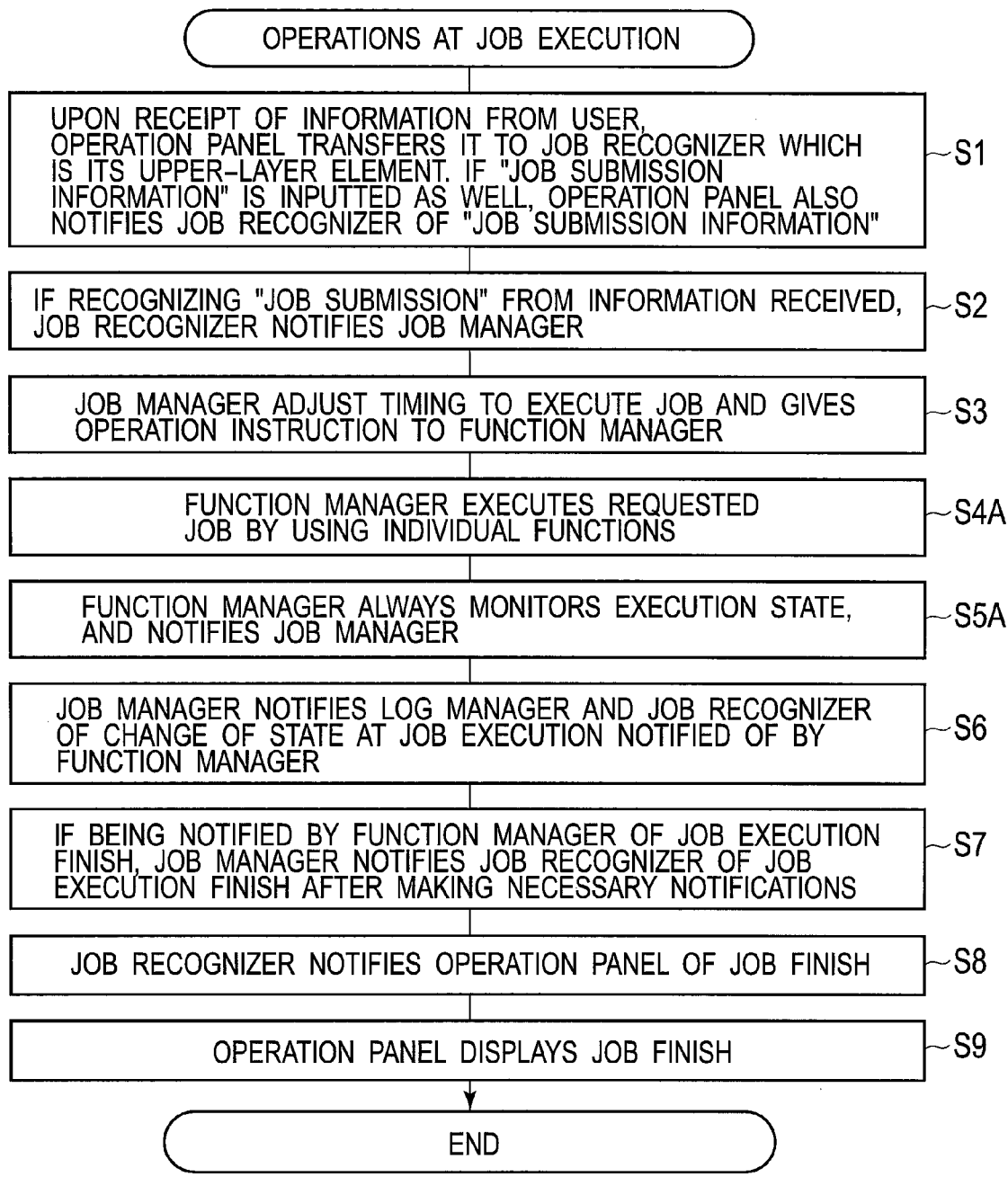

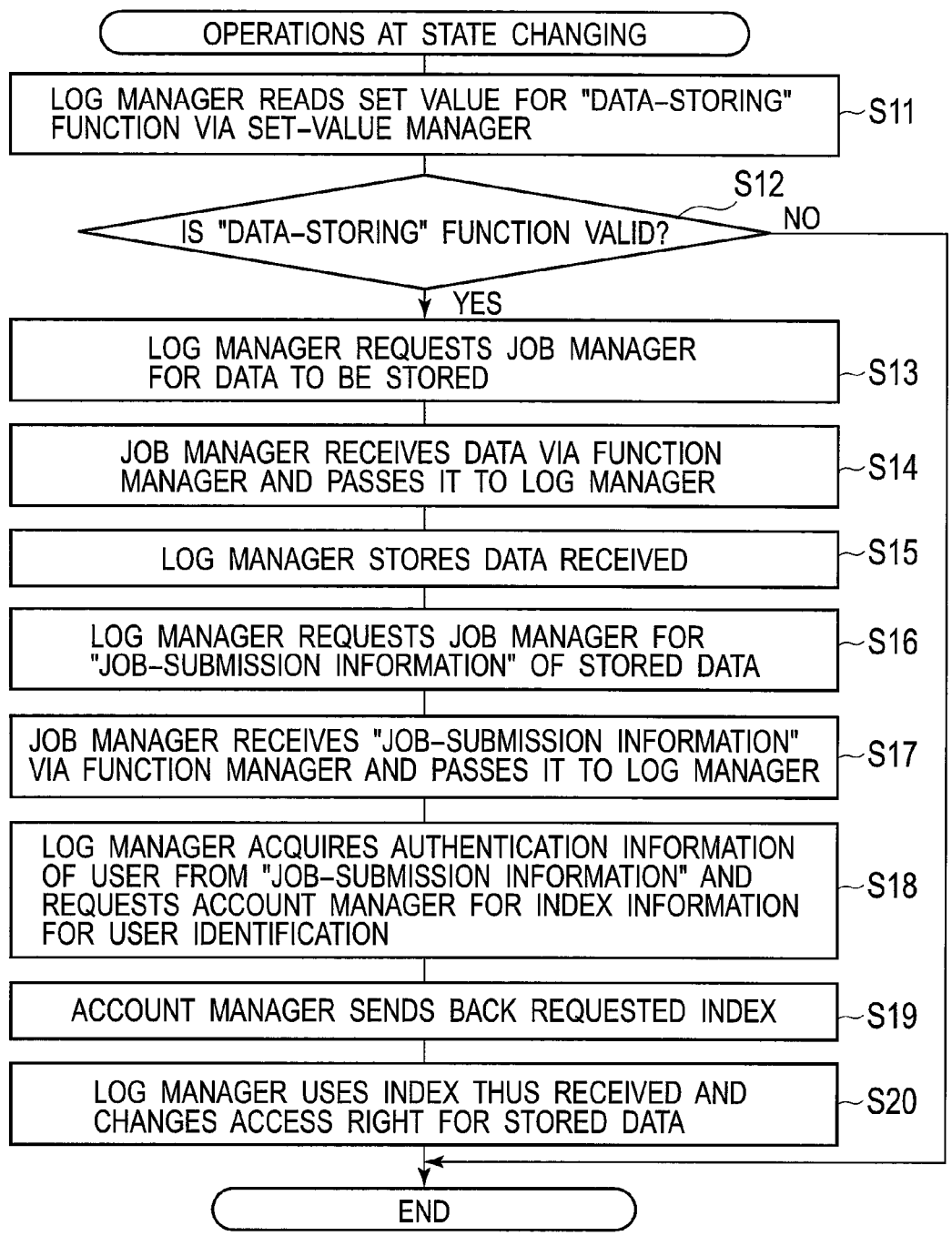

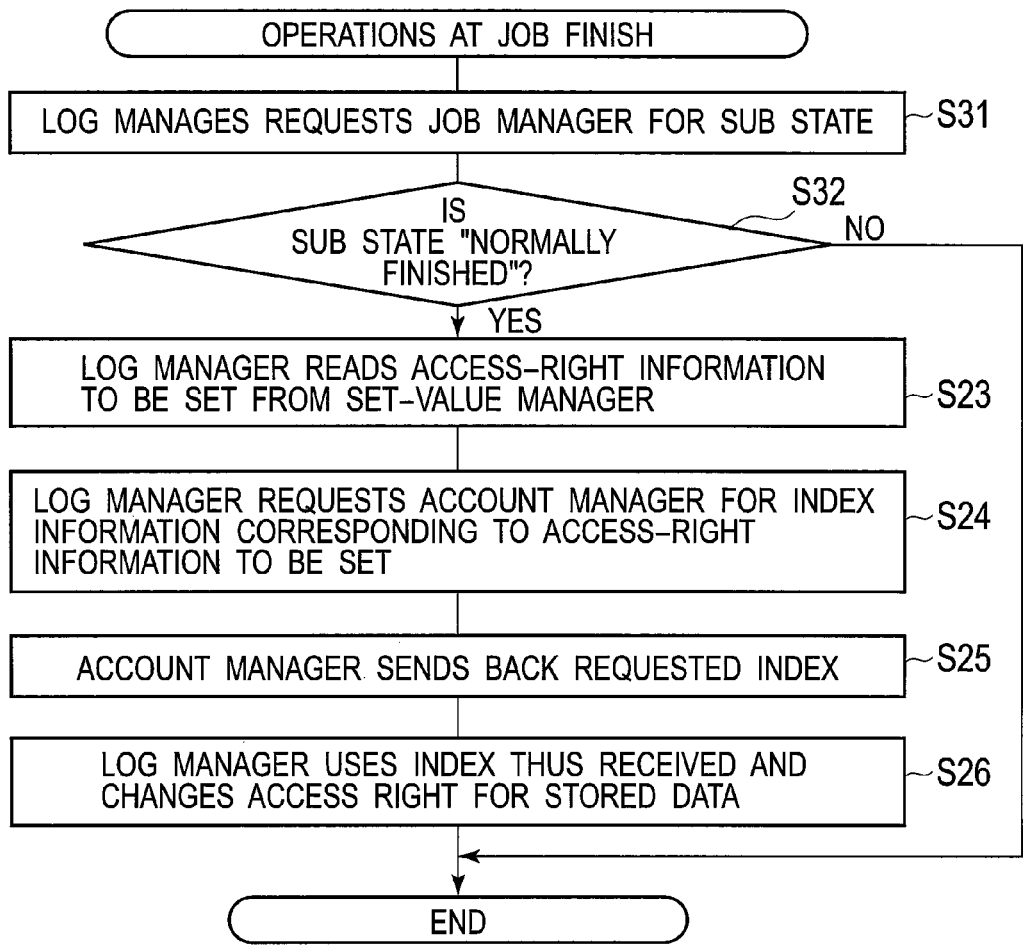

IMAGE PROCESSING APPARATUS

CROSS REFERENCE TO RELATED APPLICATIONS

This application claims priority based on 35 USC 119 from prior Japanese Patent Application No. P2009-275106 filed on Dec. 3, 2009, entitled "IMAGE PROCESSING APPARATUS", the entire contents of which are incorporated herein by reference.

BACKGROUND OF THE INVENTION

1. Field of the Invention

The invention relates to an image processing apparatus with a function to control the right to access stored data that have been processed and stored by the image processing apparatus.

2. Description of Related Art

Conventionally, when a user executes operations (a series of operations performed at one time is referred to as a "job") on an image processing apparatus, such as a multifunction machine, the user inputs an identifier for user identification to the image processing apparatus, and the image processing apparatus checks the input identifier against a list of identifiers held therein to determine whether the user is an authorized user or not. After the identifier checking, the admitted user is allowed to execute jobs on the image processing apparatus permitted for the user according to his/her own access right.

In addition, image processing apparatus in the related art typically have a function to store, as a log, data processed by the image processing apparatus in response to a request by a user. For example, if an image processing apparatus performs a job of printing a file attached to a received electronic mail (hereafter referred to as an "email"), the image processing apparatus stores, as a log, the attached file in a storage device provided either inside or outside the image processing apparatus.

In the related art, in the case of a conventional image processing apparatus configured to store as logs data processed by the image processing apparatus in response to requests by users as described above, access right to read the stored data is not permitted at all or is exclusively given to an administrator of the image processing apparatus. However, the administrator is not always the top of members of the user's work environment where the image processing apparatus is installed. For example, in some cases, an ordinary staff member assumes the role of the administrator as a part of his/her work, or, in other cases, the administration of the image processing apparatus is outsourced to a temporarily-hired external worker.

The data handled by a user of an image processing apparatus sometimes include documents that are confidential and not meant to be seen by other staff members.

A technique to store and manage such confidential data is disclosed in, for example, JP 2006-72892A. According to JP 2006-72892A, the image processing apparatus creates file names usable for storing input data by combining the input data with key data stored in advance in the apparatus, displays the usable file names to prompt a user to select one of the usable file names, and stores the data with the file name thus determined. In this way, each piece of the stored data can have a name that allows the user to easily guess the content of the stored data when the user accesses the stored data later.

SUMMARY OF THE INVENTION

Conventional image processing apparatus, however, have various problems. An image processing apparatus which performs no access-right control may cause data-leakage problems. On the other hand, an image processing apparatus which exclusively gives access right to a particular user allows only the particular user to access the stored data even when the stored data should be accessible to others. This makes it difficult to make full use of the stored data.

An aspect of the invention is an image processing apparatus including: an acquisition unit configured to acquire data targeted for image processing; a memory unit configured to store the acquired data; an output unit configured to output the data; and an access-right controller configured to provide the data with pre-defined access right when the data are stored by the memory unit, and configured to change the access right when the data are output by the output unit.

According to the image processing apparatus, while the image data exist in the apparatus, a more restrictive access-right control is applied to the stored data. Once the stored data are made available outside of the apparatus, the restrictive access-right control on the stored data can be relaxed. Accordingly, the security can be improved, and the user can make better use of the stored data.

BRIEF DESCRIPTION OF THE DRAWINGS

FIG. 3 is an explanatory diagram illustrating exemplar job-submission information input from the operation panel shown in FIG. 1.

FIGS. 4A and 4B are explanatory diagrams each illustrating an exemplar access-right setting table managed by a log manager shown in FIG. 1.

FIG. 5 is a flowchart illustrating a series of operations performed when the image processing apparatus shown in FIG. 1 executes a job.

FIG. 6 is a flowchart illustrating a series of operations performed when the image processing apparatus shown in FIG. 1 experiences a state change.

FIG. 7 is a flowchart illustrating a series of operations performed when the image processing apparatus shown in FIG. 1 finishes a job.

FIG. 10 is a flowchart illustrating a series of operations performed when the image processing apparatus shown in FIG. 8 executes a job.

FIG. 11 is a flowchart illustrating a series of operations performed when the image processing apparatus shown in FIG. 8 experiences a state change.

FIG. 12 is a flowchart illustrating a series of operations performed when the image processing apparatus shown in FIG. 8 finishes a job.

DETAILED DESCRIPTION OF EMBODIMENTS

Figure 1:
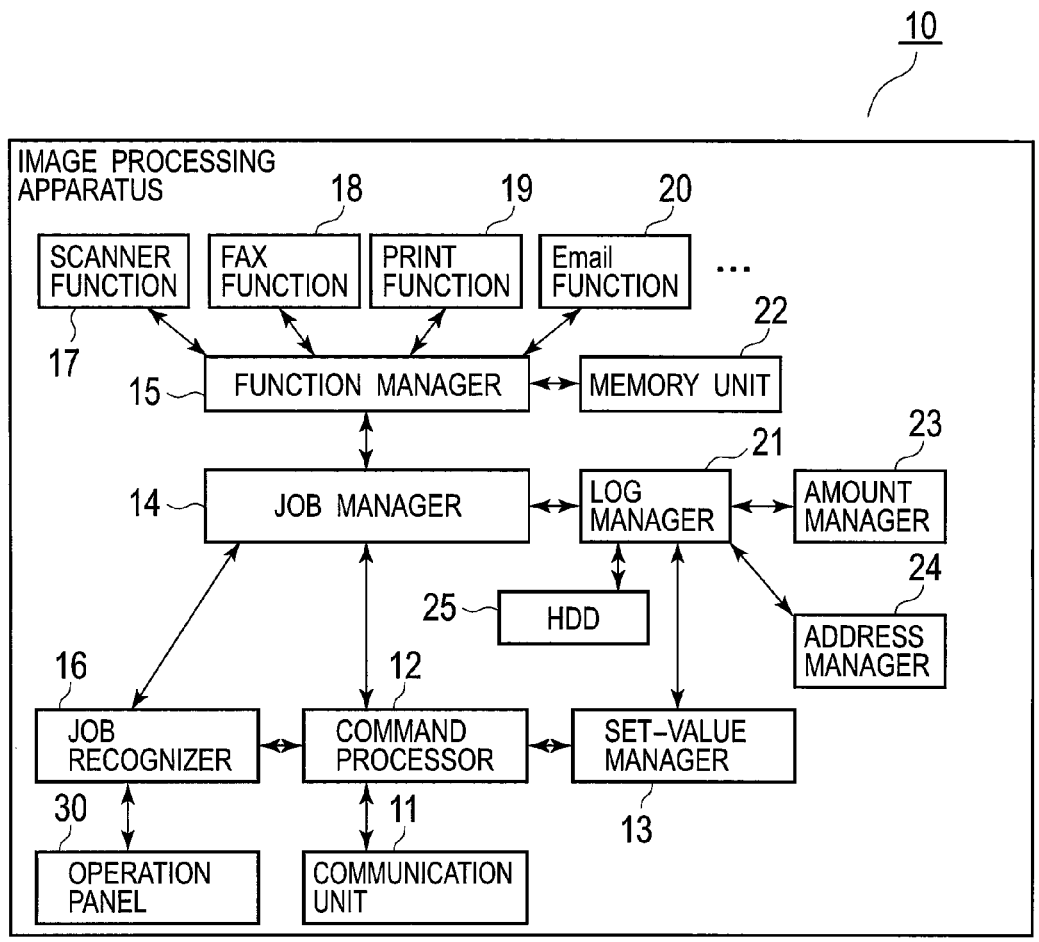
FIG. 1 is a functional block diagram illustrating the general configuration of an image processing apparatus according to Embodiment 1 of the invention.

Descriptions are provided herein below for embodiments based on the drawings. In the respective drawings referenced herein, the same constituents are designated by the same reference numerals and duplicate explanation concerning the same constituents is omitted. All of the drawings are provided to illustrate the respective examples only and do not restrict the scope of the invention.

Embodiment 1

(Configuration of Image Processing Apparatus of Embodiment 1)

FIG. 1 is a functional block diagram illustrating the general configuration of an image processing apparatus according to Embodiment 1 of the invention.

Each of the functional blocks shown in FIG. 1 performs a predetermined function by a predetermined hardware device and/or a predetermined program operating or cooperating with each other. An unillustrated controller executes each program.

Image processing apparatus 10 is, for example, a multifunction machine that includes scanner function 17, fax unit (e.g., FAX function) 18, print unit (e.g., print function) 19, and electronic mail unit (e.g., Email function) 20. Image processing apparatus 10 usually handles image data as the processing target. Image data mentioned here include text data, image data, data written in a page-description language such as PostScript, and the like.

Image processing apparatus 10 is usually connected to an unillustrated external apparatus such as a personal computer (hereafter referred to as a "PC") with a communication unit 11 and an unillustrated local area network (hereafter referred to as a "LAN").

Communication unit 11 is provided with programs corresponding respectively to communication protocols of various communication methods, and is configured to communicate to external devices using the communication protocols. Like operation panel 30, communication unit 11 functions as a gateway for the inputs/outputs between the image processing apparatus 10 and external devices. Communication unit 11 is a subordinate element of each communication protocol, so that communication unit 11 performs no spontaneous communications to exchange data. Rather, communication unit 11 is configured to operate only in response to instructions given by superior elements.

Specifically, communication unit 11 has a function to perform operations supporting not only a local serial bus standard, such as Universal Serial Bus (USB) and IEEE1394, but also a global communication protocol, such as the Internet and FAX communications. The functions of communication unit 11 of Embodiment 1 include transferring data received by communication unit 11 to command processor 12 that is a superior element in image processing apparatus 10 and transmitting, to external devices, data received from command processor 12.

Command processor 12 is a superior element of communication unit 11, and has functions to process the data received by and transferred from communication unit 11, and to transmit the information generated in the course of the processing. Alternatively, the function of command processor 12 is to transmit data requested by job recognizer 16 and job manager 14 both of which are superior elements of command processor 12.

The processing of the received data refers to a series of operations including finding out a command contained in a received data and analyzing and executing the command thus found. If the content requested by the found command is a simple one, such as referring to or changing various set values, command processor 12 itself executes the corresponding operation. If the content requested by the found command is a complex one, such as printing of the data or the like, command processor 12 transfers the received data with the command to job recognizer 16, and asks job recognizer 16 to execute necessary operations.

Command processor 12 also has the following function. If command processor 12 needs authentication of the user while executing a command, command processor 12 requests an external apparatus or a higher-layer apparatus such as a PC (not shown) to perform such authentication. Once the external apparatus executes the authentication, and the matching of rights ends successfully, command processor 12 uses, as a parameter, the user's identifier received from the external apparatus, and thus requests other functional blocks, such as job recognizer 16, set-value manager 13, and job manager 14, to execute the necessary operations. Note that when command processor 12 transmits data, command processor 12 puts the data in a form for command transmission and then requests communication unit 11 to transmit the data.

Operation panel 30 is an input/output device that is directly connected to the unillustrated controller with an internal bus interface. The data input through operation panel 30 are transferred to job recognizer 16.

Job recognizer 16 has the following function. On the basis of the data input through operation panel 30 and the data input from communication unit 11 through command processor 12, job recognizer 16 identifies the job to be invoked and identifies adjunct information that is necessary to execute the job. The above-mentioned adjunct information necessary to execute the job refers to, for example, the telephone number of the destination if the job is sending a fax, the mail address of the destination if the job is sending an email, and resolution, color density, one- or two-side printing, and the number of copies printed if the job is printing. The adjunct information necessary to execute the job is job-submission information 40. Job recognizer 16 has a function to transfer the identified job together with the adjunct information to job manager 14.

Job manager 14 is a functional block configured to receive the job requested by the user, to monitor the state of the job, and to determine whether the job has or has not been finished. In the process of receiving jobs, job manager 14 has a function to check whether the user requesting each job has the right to execute the job or not (i.e., a function to check rights). Specifically, job manager 14 checks the user's identifier input by the user requesting the job against the identifier stored in image processing apparatus 10 for the same requesting user.

Job manager 14 also has the following function. If it is found that the identifiers match as a result of the checking of rights, job manager 14 determines that the job can be executed. Then the job manager 14 attaches, to the job, the matched identifier as the identifier of the owner of the job. If the job is submitted by an internal process, job manager 14 does not check right. Instead, job manager 14 executes the job by setting the information received as a parameter.

Job manager 14 has a state monitoring function. Specifically, job manager 14 is configured to monitor the state of each job, such as waiting for a turn to be processed, having already been started and being currently in execution, or having already been started but being halted because of an error.

Job manager 14 also has a function to determine the completion of the job. Specifically, job manager 14 determines whether a particular job is completed normally or abnormally. In addition, if a particular job is completed abnormally, job manager 14 monitors the cause of the abnormality for that particular job. In addition, job manager 14 also has a function to receive a query for the state of each job and to respond to the query. In addition, job manager 14 is responsible for execution of other instructions associated with the job. Such other instructions than the monitoring include starting, pausing, cancelling, resuming, and the like. For every instruction, job manager 14 checks the job's owner by use of the identifier attached to each job before the execution of the job. If the owner is the person who gives the instruction, job manager 14 executes the job. If the person who gives the instruction is not the owner, job manager 14 has to respond by, for example, rejecting the execution of the job.

Set-value manager 13 manages various set values of image processing apparatus 10, and has a function to accept the loading of and the changing of the set values. In FIG. 1, arrows are drawn between set-value manager 13 and each of command processor 12 and log manager 21. However, since all the functional blocks use the set values, set-value manager 13 is accessible from every functional block. Set-value manager 13 has a non-volatile function, and thus is configured to retain the stored content even after rebooting or the like.

Of all the functional blocks in image processing apparatus 10, function manager 15 has a function to manage the functional block or blocks that are actually executing the job (hereafter referred to as "individual functional blocks"). Function manager 15 plays a role of assigning either the entire job or a part of the job to each individual functional block in accordance with the instruction given by job manager 14. Each functional block is made to operate accordingly.

The role of job manager 14 is to handle a job of a unit requested by the user. An example of such job is to read image data on an original document, attaching the image data to an email, and then to send the email to a designated destination (=ScanToEmail). Function manager 15, on the other hand, is configured to manage individually the processing of Scan (scanner function 17) and the processing of Email (Email function 20).

The above-described method of management on an individual-functional-block basis makes the control easier. This is because various jobs can be executed by combining these functional blocks in various ways and thus the number of individual functional blocks to be managed can be reduced. In image processing apparatus 10 of Embodiment 1, four functional blocks—scanner function 17, FAX function 18, print function 19, and Email function 20—are defined as functional blocks to execute jobs.

Scanner function 17 has a function to drive a scanner to scan an original document from a user and then to obtain image data. Scanner function 17 performs actions specific to the reading of image data on original documents, and is configured to not change spontaneously the actions according to processes subsequently performed.

FAX function 18 has a function to receive and send faxes. FAX function 18 is configured to store or transfer the received image data in or to a place designated by job manager 14. In addition FAX function 18 is configured to fax the image data to the place designated by job manager 14. FAX function 18 performs actions specific to the receiving and sending of a fax, and is configured to not change spontaneously the actions according to processes performed previously or subsequently.

Print function 19 has a function to print image data in a place designated by job manager 14 on a print medium such as a sheet of paper. Print function 19 performs actions specific to the print function, and is configured to not change spontaneously the actions according to processes performed previously.

Email function 20 has a function to receive and send emails. Email function 20 stores or transfers the received data in or to a place designated by job manager 14, and to send an email with the image data to the place designated by job manager 14. Email function 20 performs actions specific to emails, and is configured to not change spontaneously the actions according to processes performed previously.

Log manager 21 is called by job manager 14 every time the state of a job changes. Log manager 21 has a function to execute processing to acquire logs. Specifically, log manager 21 has the following function. Before a job is executed, log manager 21 determines whether data are to be stored or not by checking job-submission information 40 input by the user against the set value which is stored in set-value manager 13 and which indicates whether the storing of data is valid or invalid.

The above-mentioned storing of data refers to the log acquisition, and refers specifically to a function to store, as log information, the data either input into or output from image processing apparatus 10. Examples of input data include image data for printing received from an external apparatus, data received by fax, image data read by the scanner of the image processing apparatus 10, and the like. Examples of output data include printed image data, faxed image data, emailed image data, and the like. The function to store sequentially either in a storage device in image processing apparatus 10 or in an external server or the like is referred to as the storing of data in Embodiment 1, and the data thus stored are referred to as the stored data.

Memory unit 22 is a random access memory (hereafter referred to as the "RAM") to be used as a place where received data are temporarily stored and where commands either transmitted or received are stored. In FIG. 1, an arrow is drawn between memory unit 22 and function manager 15, but since all the functional blocks use memory unit 22, memory unit 22 is accessible from every functional block. Memory unit 22 has no non-volatile function, and does not retain the stored content after rebooting or the like.

Account manager 23 is a database where the attributes of all the users of image processing apparatus 10 are registered. The unit of managed users is a single user, a single group of users, or the like, and a record is formed for each user. The items of management include the identifier to identify each user, the character string of the name of each user, the code indicating the department or the like of each user, and the like. There are usually several kinds of identifiers to identify each user. Examples of such identifiers include sets of user names and passwords, serial numbers, finger prints, irises, and the like. Account manager 23 manages each record by an index, and is configured to access a target record by designating the record using the corresponding index.

Address manager 24 is a database where the addresses accessed by image processing apparatus 10 are stored. The unit of managed addresses is the addresses of each single user (or of each single group, or of each single device). The above-mentioned addresses include, for example, the email address of a destination to which input image data scanned by scanner function 17 are transmitted, the telephone number of a destination to which input image data scanned by scanner function 17 are faxed, and the like. Address manager 24 manages data by indexes, and is configured to access target data by designating the data using the corresponding index.

Hard disk drive (hereafter referred to as a "HDD") 25 is a nonvolatile memory, and is a memory unit to be used for storing programs, log information, and the like.

(Configuration of Operation Panel of Embodiment 1)

Figure 2:
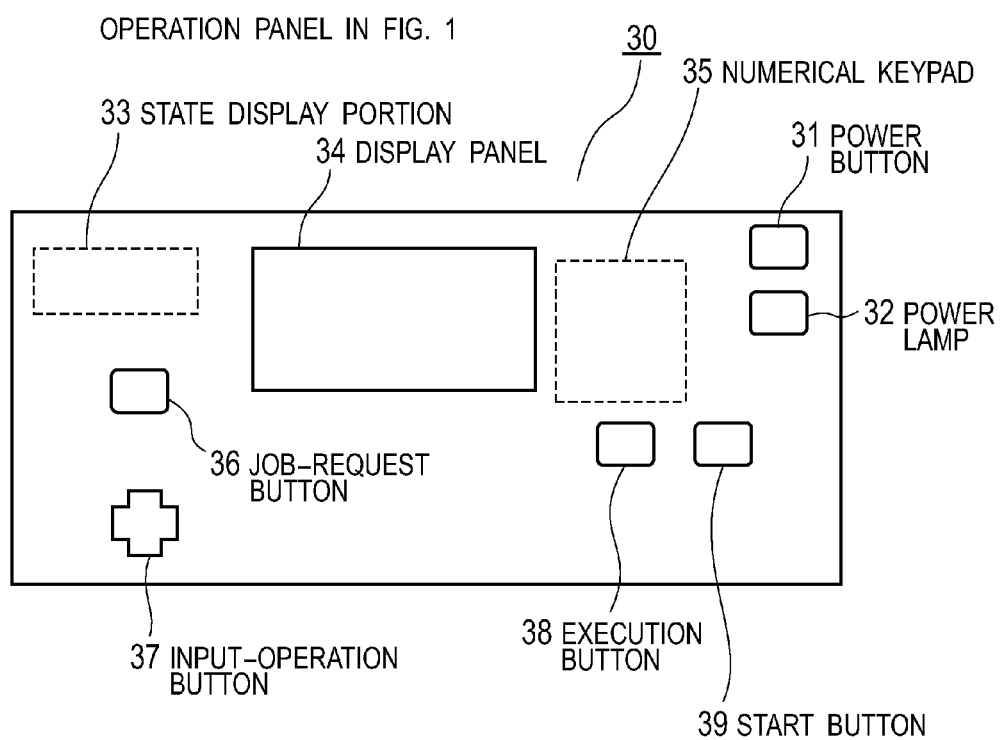
FIG. 2 is a configuration diagram illustrating an exemplar operation panel shown in FIG. 1.

FIG. 2 is a configuration diagram illustrating the operation panel shown in FIG. 1.

Operation panel 30 is an input/output device that is directly connected to the unillustrated controller with an unillustrated internal bus interface. Operation panel 30 includes: power button 31 configured to power on/off image processing apparatus 10; power lamp 32 configured to show the power on/off state; state display portion 33 using lamps to show the state of image processing apparatus 10, such as indicator of error, indicator of whether toner remains or not, and indicator of whether paper sheets still remain or not; and display panel 34 configured to display messages and guidance provided by job recognizer 16. Display panel 34 includes, for example, either a liquid crystal display device (hereafter referred to as an "LCD") or light emitting diodes (hereafter referred to as "LEDs"), and a touch panel for input. Display panel 34 is configured to show, for example, the progress of the processing that is being executed in image processing apparatus 10, the content of errors, and the set values that are made valid currently.

In addition, operation panel 30 includes: numerical keypad 35 used when the user inputs numbers; job-request button 36 used when the user requests the displaying of the job list; input-operation button 37 used when the user moves, up and down as well as from side to side, the image of the job list displayed on display panel 34 to select a particular job; execution button 38 used when the user confirms and executes the selected job; and start button 39 used, for example, when the user instructs the scanner to start scanning. Numerical keypad 35 has a function to input not only numbers but also characters.

Selectable jobs include service functions, such as COPY (copying function), ScanToEmail (function to transmit an Email with scanned image data), and ScanToFax (function to fax scanned image). Selectable jobs also include jobs associated with the maintenance and the administration of image processing apparatus 10, such as the function to change set values. The information input through operation panel 30 is transferred to job recognizer 16.

FIG. 3 is an explanatory diagram illustrating exemplar job-submission information input through the operation panel.

Job-submission information 40 is information added to a job that is submitted to image processing apparatus 10 by a user. For example, as FIG. 3 shows, user name 41, password 49, kind of submitted job 45, set value 47 for each kind of submitted job, and the like are included in the information that the user inputs when the job is submitted. User name 41 and password 49 are information that is necessary for the authentication of the user, and are checked against the information stored in image processing apparatus 10 to determine whether the user is an admitted one or not.

If the user is an admitted one, a reference is made to information on various attributes of the user registered in image processing apparatus 10, e.g., department 42 of the user, service years 43 of the user, the position 44 of the user, and the like. Necessary one or ones of all the registered attributes of each user are added to job-submission information 40. Kind of submitted job 45 is an identifier to identify the job selected by the user (hereafter referred to as a "job ID"). There are several kinds of submitted job 45, such as COPY, ScanToEmail, ScanToFax, Email transmission, Fax transmission, and the like. FIG. 3 shows an example where Email transmission is the selected kind of submitted job 45.

In addition, if image processing apparatus 10 is equipped with a clock (real-time clock) and/or if image processing apparatus 10 supports a network protocol to acquire the time from a time server, time 48 at which the job is submitted and the like are also added to the job-submission information 40.

As has been described above, job-submission information 40 is a collection of various pieces of information that are necessary to execute each job and gathered when the job is submitted. In the case of Embodiment 1, job-submission information 40 includes user name 41, department 42 of the user, service years 43 of the user 43, position 44 of the user, kind of submitted job 45, set value (address of the destination) 46, set value (file type) 47, time 48 at job submission, and password 49.

FIGS. 4A and 4B are explanatory diagrams each illustrating an exemplar access-right setting table managed by the log manager shown in FIG. 1.

Access-right setting table 50 is created when stored data are stored so that the access-right setting table 50 is associated with the stored data. In access-right setting table 50, access targets 52 and the corresponding rights are mapped and managed for each user. In access-right setting table 50, a list of access rights of the users of image processing apparatus 10 is registered. FIGS. 4A and 4B show a case of changing access right to log data. FIG. 4A shows access-right setting table 50 before the change is made, whereas FIG. 4B shows access-right setting table 50 after the change is made. In both of FIGS. 4A and 4B, the unchanged cells are marked with common signs.

In FIGS. 4A and 4B, the column titled user 51 lists the users who may possibly access the stored data. In the case of FIGS. 4A and 4B, the users who may possibly access the stored data are: user C, the owner of the stored data; the administrator; user A; and user B. The column titled access target 52 lists the access targets of each user. Access targets 52 include several functions, such as print function, copying function, Email-transmission function, and the like, and also include static data, such as stored data, set values, and the like.

The column titled reading 53 shows whether each user is or is not allowed to read the stored data. If access target 52 is a function, the action of reading is meaningless, so that a sign "--" is given to such cells. ¥datastoring¥file001.dat indicates a piece of certain stored data. A sign ○ given in a cell of reading 53 means that the corresponding user can read the certain stored data, while a sign × means that the corresponding user cannot read the certain stored data.

The column titled changing 54 shows whether each user is or is not allowed to change the stored data. If access target 52 is a function, the action of changing is meaningless, so that a sign "--" is given to such cells. The column titled execution 55 shows whether each user is or is not allowed to execute the function. If access target 52 is a piece of stored data, the action of executing is meaningless, so that a sign "--" is given to such cells. In FIG. 4A, only user C is allowed to read the stored data, but in FIG. 4B, a change is made so as to allow not only user C but also the other users to read the stored data. Since user C is the very person that has stored the data, he/she is set to be able to read the data in the initial setting.

(Operations of Image Processing Apparatus in Embodiment 1)

An ordinary user usually uses operation panel 30 to request image processing apparatus 10 to execute such jobs as COPY, ScanToEmail, ScanToFax, and the like. In addition, an ordinary user generally uses his/her own PC to request image processing apparatus 10 to execute such jobs as printing, sending fax, sending email, and the like. In addition, a job that is not directly related to the intention of any user may be submitted to image processing apparatus 10 from an external device. Specifically, Fax-reception is such a job.

Data storing is a function to store either input or output data in a predetermined storage unit (e.g., HDD 25 or an external server), and is performed in synchronization with the execution of the corresponding job. Whether such data storing is necessary or not is usually set by the administrator, so that ordinary users use image processing apparatus 10 without paying any attention to the function of data storing.

In contrast, the technique of Embodiment 1 is characterized by interlocking the operations of outputting information to outside of the organization with the right of access to stored data. For example, if a user selects a job of ScanToEmail, the user first scans the original document, and then the image data read by scanner function 17 are transmitted by Email function 20. Here, if the set value for data storing is set valid, the electronic data obtained by the scanning are stored in either HDD 25 or a predetermined external server.

In Embodiment 1, when the data storing of read image data is performed, a certain access control is set to the stored image data. In addition, if the sending of an email is finished, the address of the destination of the sent email is checked to determine whether the email has been sent to an address outside of the company or to an address within the company. If the email has been sent to an outside address, the right of accessing the stored electronic data is changed to expand the range of the users allowed to access the stored electronic data. If the email is sent to an address within the company, no change is made to the access right.

Details of the content described thus far are described, and the following description is subdivided into three series of operations: basic operations at job execution, operations at state changing, and operations at job completion. These three series of operations, operations of individual functional blocks, and the like are executed in a parallel fashion by multitasking. Such multitasking is made possible by exchanging of necessary information between different operations and by synchronizing the execution processes of different operations.

(Operations at Job Execution by Image Processing Apparatus of Embodiment 1)

FIG. 5 is a flowchart illustrating a series of operations performed when the image processing apparatus shown in FIG. 1 executes a job.

This series of operations is started when a user submits a job to image processing apparatus 10 by means of operation panel 30. As described earlier, there are several ways in which a user submits a job to image processing apparatus 10, but the following description focuses solely on a case where a user submits a job of ScanToEmail by means of operation panel 30.

At step S1, when a user selects a job by an operation on operation panel 30, operation panel 30 notifies job recognizer of the corresponding job ID. In addition, a part of job-submission information 40 is input by an operation of the user by means of operation panel 30. Job recognizer 16 is notified of the input value together with the job ID.

At step S2, job recognizer 16 checks the notified job ID and, if recognizing a job submission, notifies job manager 14 of the job submission together with job-submission information 40. At step S3, once image processing apparatus 10 becomes ready for the execution of the job, job manager 14 notifies function manager 15 of the job ID to instruct the execution of the job.

At step S4, to execute the job of ScanToEmail requested by the user, function manager 15 selects a necessary one or ones from the individual functional blocks. In the case of Embodiment 1, scanner function 17 and Email function 20 are selected, and a data path is connected between these two functions. Once the connection is completed, each function is notified of the set values input by the user by means of job-submission information 40, and thus starts its actions.

At step S5, function manager 15 always monitors the state of scanner function 17 and that of Email function 20. If a change occurs in any of the states, function manager 15 notifies job manager 14 of the occurrence of the change. Each state is roughly subdivided into the following main states: "before job execution," "job in execution," "job finished," "job in error," and the like. Usually, each main state has more finely defined sub states so that the state can be expressed in more detail. For example, "job finished" is finely classified into the sub-states: "normally finished," "abnormally finished," "cancelled," and the like. "Job in error" is finely classified into the sub-states: "paper run out," "paper jammed," "toner run out," and the like. In the description of Embodiment 1, the information that is necessary when function manager 15 notifies job manager 14 of the change is one on the main state.

At step S6, if job manager 14 is notified of a change of state by function manager 15, job manager 14 executes necessary operations and notifies each functional block that needs the knowledge of the state change. Each functional block that needs such knowledge of the state change has to register itself to job manager 14 at the time when image processing apparatus 10 is booted. Job manager 14 only notifies the registered functional block of the state change, and accordingly has no concern with what kinds of operations are to be executed after the notification.

After job manager 14 notifies job recognizer 16 of the state change, operation panel 30 is notified of such information, and the state of the job execution is displayed on display panel 34. The series of operations that follow the notification to log manager 21 are described later in more detail by referring to FIG. 6.

If job manager 14 is notified of "job finished" by function manager 15, job manager 14 notifies each registered functional block of the state change as described above, and then, at step S7, sends a job-finishing instruction to function manager 15 to request for the releasing of internal resources of memory unit 22 or the like.

If job recognizer 16 is notified of "job finished" by job manager 14, job recognizer 16 notifies operation panel 30 of the information. Then, operation panel 30 displays the main state "job finished" on display panel 34, but it is preferable to display the sub-state as well, so that operation panel 30 requests, through job recognizer 16, job manager 14 to send the sub state.

Then at step S9, operation panel 30 creates a notification message based on the information acquired through job recognizer 16 on both the main state (e.g., "job finished") and the sub-state (e.g., "normally finished"), and displays the created notification message on display panel 34.

(Operations at State Changing by Image Processing Apparatus of Embodiment 1)

FIG. 6 is a flowchart illustrating a series of operations performed when the image processing apparatus shown in FIG. 1 experiences a state change.

A set value indicating whether data storing is valid or invalid has been set in set-value manager 13 by the administrator. At step 11, in response to a notification of state change, log manager 21 requests set-value manager 13 for the set value for the data storing, and reads the set value.

At step S12, if the setting for data storing is valid, log manager 21 determines whether the job to be executed is or is not a target for data storing. If the jobs that are the target for data storing are listed in set-value manager 13, log manager 21 makes this determination by checking the job to be executed against the list. If log manager 21 concludes that the data are to be stored (YES), the operation at step S13 is executed next. On the other hand, if data storing is invalid (NO), the series of operations are finished.

At step S13, log manager 21 requests job manager 14 for data to be stored using a data-storing function. There are various designs for this portion. For example, log manager 21 may request job manager 14 in advance to notify log manager 21 when data are ready. The description of Embodiment 1 is based on a case where log manager 21 requests data.

At step S14, job manager 14 receives, via function manager 15, the data scanned and read by scanner function 17, and sends the received data to the requestor, that is, log manager 21. For example, if these operations at state changing had started at the timing of the state becoming "job in execution," scanner function 17 has just started operating and it may still need more time to finish reading the original document. In this case, job manager 14 waits for the reading of the original document to be finished, receives sequentially the read electronic data, and then transfers the received electronic data to log manager 21. In addition, the data read by scanner function 17 are transferred, by way of another route, to Email function 20, and then the corresponding job is executed.

At step S15, log manager 21 retains, as stored data, the data for data storing received from job manager 14. The retention refers to a storing method that guarantees that the stored data remain stored even if the apparatus is powered off. Specifically, in the operation of retention, the data are stored in HDD 25 or the data are stored in a nonvolatile memory such as HDD 25 in a particular server on the network after logging in the server.

At step S16, once log manager 21 finishes the retention of the data, log manager 21 requests job manager 14 for job-submission information 40 of the target job. As FIG. 3 shows, job-submission information 40 is information input by a user to image processing apparatus 10 when the user submits a job to image processing apparatus 10. In general, the user inputs user name 41, password 49, kind of submitted job 45, and set value 47 for each kind of submitted job.

User name 41 and password 49 are inputs that are necessary for ordinary authentication. These input values are checked in image processing apparatus 10 to determine whether the user is an admitted one or not. If the user is an admitted one, there must be the information on the user registered in image processing apparatus 10. Here, log manager 21 needs the identifiers of the user who submits the job, that is, user name 41 and password 49.

At step S17, job manager 14 acquires job-submission information 40 through function manager 15, and notifies log manager 21 of the acquired job-submission information 40. At step S18, from job-submission information 40 thus acquired, log manager 21 acquires the identifiers of the user who submits the job, that is, user name 41 and password 49, and then transfers these identifiers to account manager 23 to acquire an index. The index refers to an identifier to be used by account manager 23 to identify a particular user. By making a designation with the index, a user registered in image processing apparatus 10 can be identified.

Each user uses not an index but his/her own user name 41, password 49, and the like as information to identify him/herself. Indexes are the identifiers to be used in image processing apparatus 10 for the purpose of identifying their respective users.

At step S19, account manager 23 sends back the index of the designated user. Then, at step S20 access-right controller (e.g., log manager) 21 uses the acquired index to set the access right to the stored data. In Embodiment 1, the access right is set so that only the user who submits each job can read the corresponding data stored by the data storing function. At this moment, even the administrator cannot read the stored data.

(Operations at Job Finish by Image Processing Apparatus of Embodiment 1)

FIG. 7 is a flowchart illustrating a series of operations performed when the image processing apparatus shown in FIG. 1 finishes a job.

At step S21, log manager 21 is called at the timing when the main state of "job in execution" is changed to another main state of "job finished." Log manager 21 then checks whether the sub-state is or is not "normally finished." If the sub-state is "normally finished," log manager 21 refers to the target job-submission information 40 to read set value 46 (address of the destination). The notification of "job finished" has been made by this moment, so that the fact that the Email transmission has been finished is guaranteed.

At step S22, log manager 21 determines whether the email address (set value 46) of the destination of the email that has been finished is an address outside of the company or an address within the company. To perform the determination, the domain of the email address of the destination is checked. If the domain of the destination differs from the domain of its own apparatus (i.e., image processing apparatus 10), log manager 21 can conclude that the email has been sent to an address outside of the company.

In the case, for example, of sending a fax, log manager 21 determines whether a particular transmission is destined for a place outside of the company or a place within the company by checking whether the telephone number of the destination is an extension number or an external number. In addition, in the case of a communication using a network protocol, the determination by log manager 21 is based on whether the IP address of the destination is one within the company or one outside of the company. In all the above-mentioned cases, all the addresses (i.e., domains, telephone numbers, and IP addresses) within the company have been set in set-value manager 13, and these addresses are read at this timing in the operational sequence. If the transmission is destined for a place other than those set in set-value manager 13, log manager 21 can conclude that the transmission is destined for a place outside of the company. In this way, log manager 21 determines whether the transmission is destined for a place within the company or a place outside of the company. If the destination is outside of the company, the operation at step S23 is executed next. If the destination is within the company, the series of operations are finished.

At step S23, log manager 21 reads, from set-value manager 13, the content of the change made to the access right. In Embodiment 1, a change is made to the access right to a particular piece of data that is made available to a person outside of the company. Alternatively, the right to read every piece of data may be additionally given to the administrator in a fixed manner. In Embodiment 1, the access right to the data made available to a person outside of the company is changed in accordance with the content registered in set-value manager 13.

At step S24, in accordance with the content of change read from set-value manager 13, log manager 21 requests account manager 23 for the necessary index. For example, if the content of change is such that the right to read the data is given to user A, user B, and the administrator, log manager 21 requests the indexes of user A, user B, and the administrator.

At step S25, account manager 23 sends back the requested indexes. Then at step S26, log manager 21 uses the acquired indexes to change the access right to the stored data, and thus the series of operations is finished.

Now the changing of access right is described by referring to FIGS. 4A and 4B. A list of users who use image processing apparatus 10 is registered in access-right setting table 50. The access targets 52 and the corresponding rights are mapped and managed for each user 51. Examples of access targets 52 include such operations as copying, printing, and sending an email, and also include such static data as stored data and set values. Examples of rights include reading 53 indicating whether the user is or is not allowed to read the target 52, changing 54 indicating whether the user is or is not allowed to change the target 52, execution 55 indicating whether the user is or is not allowed to execute the target 52, and the like.

In Embodiment 1, it is assumed that user C is the person who submits the job and that a series of operations are performed to make a setting allowing users (user A, user B, and the administrator) designated by indexes to read a piece of stored data, i.e., access target 52. Each of FIGS. 4A and 4B shows that the data stored in this job is named file001.dat and is stored in a directory named "¥datastoring." The right to read the file is changed so that the rights of user A, user B, and the administrator are changed to be valid. Since user C is the person who submits the job, the right to read the file has already given to user C by the operational sequence described earlier by referring to FIG. 6.

The right to change the target is not described in Embodiment 1, but the right to change may be changed as well. The right to execute the target is not changed here because the file is a data file, which is never to be executed.

As has been described in detail thus far, according to Embodiment 1, the data stored by the data-storing function is made accessible only to the person who submits the corresponding job, and once the stored data are made available to a person outside of the company, the stored data are made available to the user or users having been designated beforehand. If a piece of data including personal information is made accessible to the owner of the personal data, and if the access right to the data is made unchangeable even after the piece of data is made available to a person outside of the company, the administrator, the owner's superior, or the like cannot check or monitor the data.

In Embodiment 1, if the job is ScanToEmail, for example, the state of access right to the scanned data file001.dat shown in FIG. 4A is changed to the state shown in FIG. 4B when an email with the data is sent to a person outside of the organization. Specifically, before the email is sent, none of the administrator, user A, and user B has the right to read the data file001.dat, but they are allowed to read the data file001.dat after the sending of the email. In addition, the data stored using the log function are described in Embodiment 1, but similar description is applicable to a case of the data stored as spool or temporarily stored.

(Advantageous Effects of Embodiment 1)

Image processing apparatus 10 of Embodiment 1 has the following advantageous effects.

Specifically, while the stored data exist in the organization, a more restrictive access-right control is applied to the stored data. Once the data are made available to outside of the organization, the restrictive access-right control on the stored data can be relaxed. Accordingly, the security can be improved, and the user can make better use of the stored data.

Second Embodiment (Configuration of Image Processing Apparatus of Embodiment 1)

Figure 8:
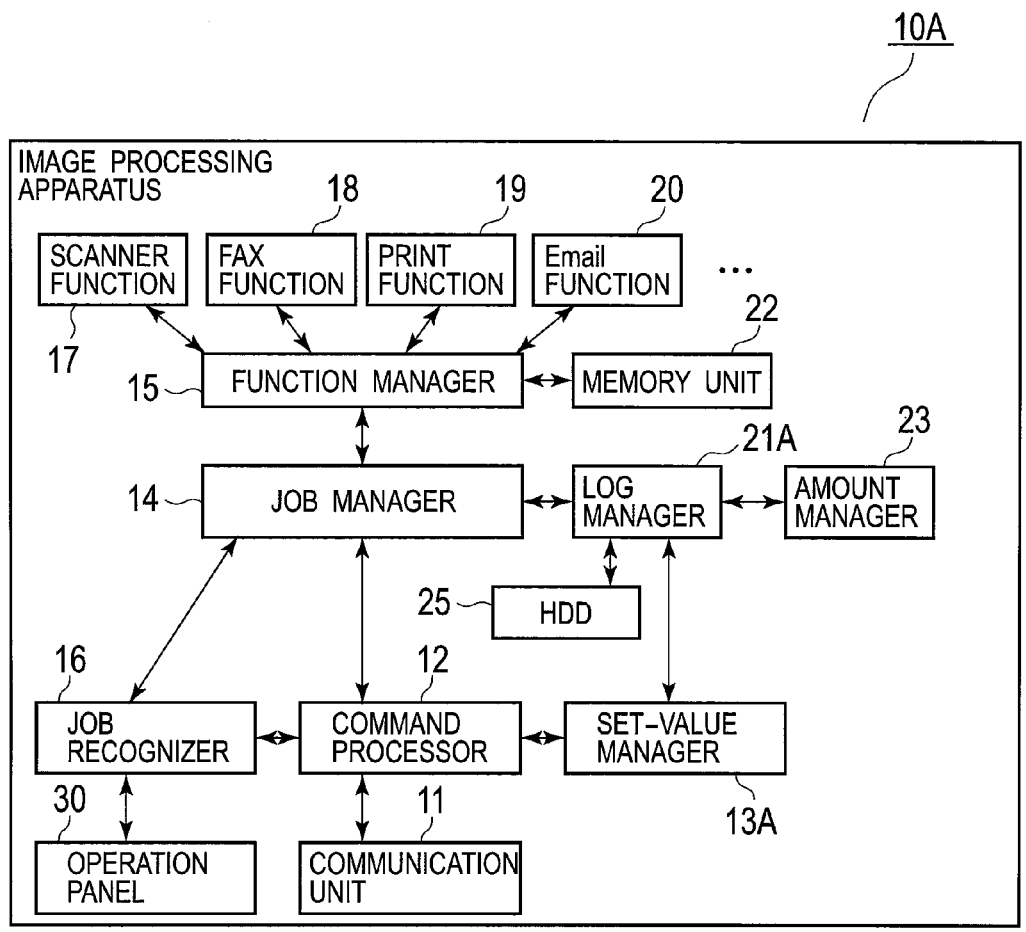
FIG. 8 is a functional block diagram illustrating the general configuration of an image processing apparatus according to Embodiment 2 of the invention.

FIG. 8 is a functional block diagram illustrating the general configuration of an image processing apparatus according to Embodiment 2 of the invention. Those elements in FIG. 8 that are common to the elements shown in FIG. 1 representing Embodiment 1 are denoted respectively by the same reference numerals used in FIG. 1.

Image processing apparatus 10A of Embodiment 2 includes set-value manager 13A and log manager 21A in place of set-value manager 13 and set-value manager 21 of Embodiment 1. The configuration of set-value manager 13A and that of log manager 21A differ respectively from the configuration of set-value manager 13 and log manager 21, respectively. In addition, image processing apparatus 10A does not include address manager 24, which is included in image processing apparatus 10 of Embodiment 1. The other constituents of image processing apparatus 10A are the same as their respective counterparts included in image processing apparatus 10 of Embodiment 1.

Although the configuration of set-value manager 13A differs from that of set-value manager 13 of Embodiment 1, set-value manager 13A manages set values of image processing apparatus 10A and accepts the reading of and the changing of the set values as in the case of Embodiment 1. In FIG. 8, arrows are drawn only between set-value manager 13A and each of command processor 12 and log manager 21A, but actually set-value manager 13A is accessible from all the functional blocks. Set-value manager 13A has a non-volatile function, and is configured to retain the stored content even after rebooting or the like.

Set-value manager 13A differs from set-value manager 13 of Embodiment 1 in having no information to be used for the determination as to whether a particular location is within or outside of the organization.

Although log manager 21A has a different configuration from that of log manager 21 of Embodiment 1, log manager 21A is called by job manager 14 every time the state of the job changes as in the case of Embodiment 1, and performs approximately the same operations as those performed in Embodiment 1. Specifically, log manager 21A differs from log manager 21 of Embodiment 1 in performing no operations to determine whether a particular location is within or outside of the organization.

Figure 9:
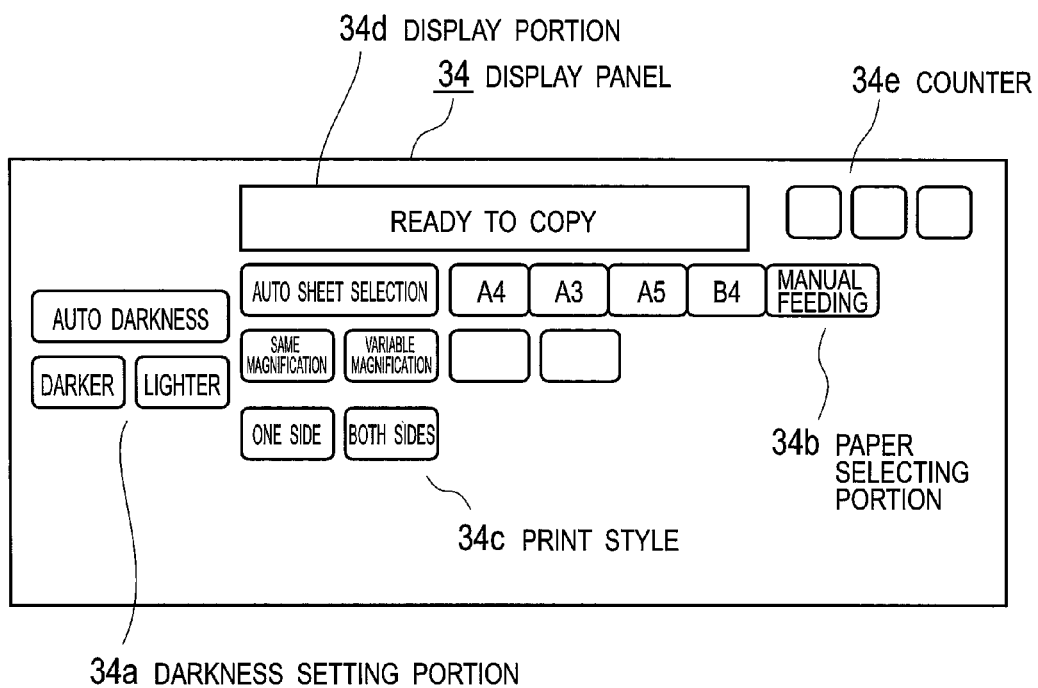
FIG. 9 is an explanatory diagram illustrating an exemplar display that appears on the display panel of an operation panel shown in FIG. 2.

FIG. 9 is an explanatory diagram illustrating an exemplar display that appears on the display panel of an operation panel shown in FIG. 2. Display panel 34 includes, for example, either an LCD or LEDs, and a touch panel for input. Display panel 34 is configured to show, for example, the progress of the processing that is being executed in image processing apparatus 10A, the content of errors, the set values that are made valid currently, and the like. The example of FIG. 9 shows an exemplar display that appears on display panel 34 when COPY is executed.

Darkness setting portion 34a includes buttons to designate the darkness of copy. Paper selecting portion 34b includes: buttons to manually select the size of the paper sheet from A4, A3, A5, B4, and the like; a button to make image processing apparatus 10A select automatically an appropriate size; and a button to select the manually feeding of a paper sheet. Print style 34c includes buttons to select the styles of the copying, that is, to select whether the copying is performed by the same magnification or by variable magnification, and whether the copying is performed on only one surface of each paper sheet or on both surfaces thereof. Display portion 34d is configured to display various kinds of messages such as "ready for copying." Counter 34e is a display portion to show a counter to count the number of copies that have been done or the number of original documents that have been read.

(Operations of Image Processing Apparatus in Embodiment 2)

Embodiment 2 is characterized by interlocking the outputting of data by image processing apparatus 10A with the right of accessing stored data. The following description of Embodiment 2 is based on a case of a job COPY in which a user causes image processing apparatus 10A scan an original document and print the read data.

(Operations at Job Execution by Image Processing Apparatus of Embodiment 2)

FIG. 10 is a flowchart illustrating a series of operations performed when the image processing apparatus shown in FIG. 8 executes a job. Those elements in FIG. 10 that are common to the elements shown in FIG. 5 representing Embodiment 1 are denoted respectively by the same reference numerals used in FIG. 5.

The series of operations at "job execution" in Embodiment 2 includes steps S4A and S5A in place of steps S4 and S5 shown in FIG. 5 of Embodiment 1. The operations performed at step S4A and S5A differ respectively from the operations performed at S4 and S5. The operations at steps S1 to S3 and S6 to S9 are the same as those in Embodiment 1.

As in the case of Embodiment 1, at step S1, if a user selects a job by an operation on operation panel 30, operation panel 30 notifies job recognizer 16 of the corresponding job ID. The subsequent operations at steps S2 and S3 are performed in a similar manner to that in Embodiment 1.

At step S4A, function manager 15 selects a necessary one or ones from all the individual functional blocks to execute the job of COPY instructed by the user. In Embodiment 2, scanner function 17 and print function 19 are selected, and a data path is connected between these two selected functional blocks. Once the connection is completed, each function is notified of some of the set values included in job-submission information 40 to start the operation. The set values notified here are the ones input by the user.

At step S5A, function manager 15 always monitors the state of scanner function 17 and that of print function 19. If any of the states changes, function manager 15 notifies job manager 14 of the occurrence of such changes. From then on, the operations at steps S6 to S9 are executed in a similar manner to that in Embodiment 1.

(Operations at State Changing by Image Processing Apparatus of Embodiment 2)

FIG. 11 is a flowchart illustrating a series of operations performed when the image processing apparatus shown in FIG. 8 experiences a state change. Those elements in FIG. 11 that are common to the elements shown in FIG. 6 representing Embodiment 1 are denoted respectively by the same reference numerals used in FIG. 6.

The series of operations at state changing in Embodiment 2 is basically the same as that in Embodiment 1 except the following point. While the series of operations shown in FIG. 6 of Embodiment 1 is for a job of ScanToEmail, the series of operations shown in FIG. 11 of Embodiment 2 is for a job of COPY.

(Operations at Job Finish by Image Processing Apparatus of Embodiment 2)

FIG. 12 is a flowchart illustrating a series of operations performed when the image processing apparatus shown in FIG. 8 finishes a job. Those elements in FIG. 12 that are common to the elements shown in FIG. 7 representing Embodiment 1 are denoted respectively by the same reference numerals used in FIG. 7.

The series of operations at "job finish" in Embodiment 2 includes steps S31 and S32 in place of steps S21 and S22 shown in FIG. 7 of Embodiment 1. The operations performed at steps S31 and S32 differ respectively from the operations performed at steps S21 and S22. The operations at steps S23 to S26 are the same as those in Embodiment 1.

At step S31, when log manager 21A is called at a timing at which the main state is changed from "job in execution" to "job finished," log manager 21A checks the sub-state. At step S32, if the sub-state is "normally finished" (YES), the operation at step S23 is executed next. If the sub-state is not "normally finished" (NO), the series of operations are finished. If the data corresponding to the target job are not stored, the series of operations are not performed. From then on, the operations at steps S23 to S26 are executed in a similar manner to that in Embodiment 1.

As has been described in detail thus far, according to Embodiment 2, the data stored by the data-storing function is set accessible only to the person who submits the corresponding job, and once the stored data are output to outside of the apparatus, the stored data can be made available to the designated user or users.

The description of Embodiment 2 is based on a case of a job of COPY, so that the changing of access right is done when the job is finished. If the selected job is, for example, FAX transmission, that is, a job that makes the image data reach the destination at the time when the transmission is started, the changing of access right is done at the start of the job. In this case, the access right is changed even if the transmission is not finished normally.

In addition, the data stored using the log function are described in Embodiment 2, but similar description is applicable to a case of the data stored as spool or temporarily stored.

(Advantageous Effects of Embodiment 2)

Image processing apparatus 10A of Embodiment 2 has the following advantageous effects.

Specifically, while the data exist in the apparatus, a more restrictive access-right control is applied to the stored data. Once the data are made available to outside of the apparatus, the restrictive access-right control on the stored data can be relaxed. Accordingly, the security can be improved, and the user can make better use of the stored data.

(Modifications)

The invention is not limited to the above-described embodiments, but various other forms of use and modifications are possible. Examples of such other forms of use and modifications include the following items (a) to (d).

(a) The descriptions of Embodiments 1 and 2 are based on the cases where each of image processing apparatus 10 and 10A is a multifunction machine. The invention, however, is not limited to such cases. The invention is also applicable to a fax machine, a photocopier, a multifunction printer/product/peripheral (MFP), and the like.

(b) The descriptions of Embodiments 1 and 2 are based on the cases where the organization is a company, but the invention is not limited to such cases. For example, the organization may be a government office and an institution.

(c) The description of Embodiment 1 is based on the case where if the data are made available to a person outside of the company, the control on the access right to the data is relaxed. It is, however, possible that if the data are made available to a person belonging to a second company and the second company and the company of the user have such a close business relationship with each other that these companies have signed confidentiality agreements, the person of the second company may be treated as a staff of the company of the user. To put it simply, even if the data are made available to a person of such a second company, the control on the access right may be kept restrictive.

(d) The descriptions of Embodiments 1 and 2 are based on the cases where the data are image data, but the invention is not limited to such cases of image data. For example, the data may be sound data, sound-source data, a program, or signal data.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image processing apparatus located inside an organization, comprising:
    an acquisition unit configured to acquire data;
    a memory unit configured to store the acquired data;
    an output unit configured to output the acquired data;
    an access-right controller configured to provide the acquired data with different levels of access right; and
    a determination unit configured to determine whether the acquired data are output to an address outside or inside of the organization,
    wherein when it is determined that the acquired data are output to an address outside of the organization, the access-right controller changes the levels of access right of the acquired data stored in the memory unit, so as to lessen restriction of access to the acquired data.

2. The image processing apparatus of claim 1, wherein the data are image data, and the acquisition unit is any one of a scanner configured to read the image data on an original document and a communication unit configured to receive the image data sent from an external device.

3. The image processing apparatus of claim 2, wherein the output unit is a print unit configured to print the image data on a print medium.

4. The image processing apparatus of claim 2, wherein the output unit is a facsimile unit configured to fax the image data.

5. The image processing apparatus of claim 2, wherein the output unit is an email unit configured to email the image data.

6. The image processing apparatus of claim 1, wherein the memory unit is a nonvolatile memory.

7. The image processing apparatus of claim 1, wherein the access-right controller expands access rights to a larger range comprising user or users within the organization that have been designated beforehand and who are allowed to directly access the acquired data stored in the memory unit.

8. The image processing apparatus of claim 1, wherein the output data are data read by a scanner.

9. The image processing apparatus of claim 1, wherein the access right is information showing whether to permit reading of the acquired data stored in the memory unit.

10. The image processing apparatus of claim 1, wherein when the determination unit determines that the data are output to an address inside the organization, the access-right controller is configured not to change the levels of access right of the acquired data stored in the memory unit.

* * * * *